United States Patent
Ackerman et al.

(10) Patent No.: US 9,160,742 B1
(45) Date of Patent: Oct. 13, 2015

(54) LOCALIZED RISK ANALYTICS FOR USER AUTHENTICATION

(71) Applicant: EMC Corporation, Hopkinton, MA (US)

(72) Inventors: Karl Ackerman, Topsfield, MA (US); Edward W Vipond, Gardner, MA (US); Daniel A Wilder, Derry, NH (US); Yong Qiao, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/040,248

(22) Filed: Sep. 27, 2013

(51) Int. Cl.
    *H04L 29/06* (2006.01)

(52) U.S. Cl.
    CPC ........ *H04L 63/0853* (2013.01); *H04L 63/0815* (2013.01); *H04L 63/0876* (2013.01); *H04L 63/1483* (2013.01)

(58) Field of Classification Search
    CPC ............... G06F 21/316; G06F 21/554; G06F 2221/2113; H04L 63/0815; H04L 63/0853; H04L 63/1483; H04L 63/0876; H04L 9/3213; H04L 67/02
    USPC ............................................. 726/3, 5, 28, 29
    See application file for complete search history.

(56) References Cited

U.S. PATENT DOCUMENTS

| | | | |
|---|---|---|---|
| 7,587,348 B2 * | 9/2009 | Liao et al. | 705/35 |
| 8,112,066 B2 | 2/2012 | Ben Ayed | |
| 2008/0103972 A1 * | 5/2008 | Lanc | 705/44 |
| 2011/0212707 A1 | 9/2011 | Mahalal | |
| 2012/0042365 A1 * | 2/2012 | Shoval et al. | 726/7 |
| 2012/0144461 A1 * | 6/2012 | Rathbun | 726/5 |
| 2013/0133086 A1 * | 5/2013 | Liberman et al. | 726/28 |
| 2013/0197998 A1 * | 8/2013 | Buhrmann et al. | 705/14.53 |
| 2013/0227016 A1 * | 8/2013 | Risher et al. | 709/204 |
| 2013/0227291 A1 * | 8/2013 | Ahmed et al. | 713/171 |
| 2014/0146510 A1 * | 5/2014 | Wilczynski | 361/816 |

* cited by examiner

*Primary Examiner* — Chau Le
*Assistant Examiner* — Don Zhao
(74) *Attorney, Agent, or Firm* — BainwoodHuang (57) ABSTRACT

An improved technique involves sending a user's authentication information to a local authentication device that computes a risk score and sends the risk score to a remote authentication server that determines whether the user is able to be authenticated. When the user makes an authentication or transaction request from an electronic device such as a computer or smartphone, the electronic device sends predictor values such as geo location and wireless signal strength to the local authentication device. The local authentication device then computes a risk score based on the received predictor values and historical predictor values. The local authentication device sends this risk score to a remote authentication server which determines from this risk score and other factors whether the user is able to be authenticated.

19 Claims, 5 Drawing Sheets

Receiving, by an authentication device, values of a set of predictors over a private connection from an electronic device, the private connection connecting the electronic device to the authentication device only, the set of predictors including an identifier of an authorized user

112

↓

Generating a risk score based on the values of the set of predictors, the risk score being indicative of a likelihood that the user is the authorized user

114

↓

Sending the risk score to an authentication server over a public connection, the authentication server being configured to provide an authentication result based on the risk score and being located remote from the electronic device, the authentication result indicating whether the user is the authorized user

116

LOCALIZED RISK ANALYTICS FOR USER AUTHENTICATION

BACKGROUND

Electronic service providers receive login attempts from users wishing to gain access to sensitive information such as bank accounts. Some users attempt to gain access to such information with credentials obtained fraudulently from a legitimate account holder.

Most basic authentication techniques are designed to control access to such sensitive information. For example, some basic authentication techniques involve presenting a username and password or answering a set of questions to which only a legitimate account holder should know the answers. More secure authentication techniques may involve presenting a one-time password (OTP) from a token in addition to the username and password.

More advanced authentication techniques, on the other hand, involve comparing transaction data with historical transaction data using rule-based computation, statistical analysis, or machine learning techniques. Conventional techniques involve sending the transaction data to a remote authentication server that is configured to access such historical data. When comparing this data to the historical data, the authentication server may then determine the likelihood that the user is the authorized user. For example, a user attempts to make a credit card purchase at 3 AM in Philadelphia. Upon receiving this information, the authentication server finds that this user has been making credit card purchases between the hours of 7 PM and 9 PM from Boston. In such a case, the authentication server may determine that there is a high risk of the user being fraudulent and will take further action.

SUMMARY

Unfortunately, there are deficiencies with the above-described conventional techniques. For example, because the authentication server described above is typically located in a remote location, the transaction data being sent to it as part of an authentication process could potentially be exposed over an insecure network and beyond the user's control. Along these lines, consider the above legitimate customer making a credit card purchase from Boston between 7 PM and 9 PM in which transaction information is sent to an authorization server for authentication. Such transaction information may include sensitive information such as the precise location of the customer, the customer's biometric information, and other personally identifiable information (PII). Verifying that this user is the legitimate account holder therefore involves a risk of exposing the legitimate account holder's privacy information to third parties over an insecure network.

In contrast to the above-described conventional advanced authentication techniques in which there is a risk of exposing a customer's privacy information to third parties over an insecure network, an improved technique involves sending a user's information from a user's electronic device such as a mobile device or a computer to a local authentication device that computes a risk score that is indicative of a likelihood that the user is an authorized user of the electronic device and the local authentication device, and sends the risk score to a remote authentication server that determines whether the user is able to be authenticated. When the user makes an authentication or transaction request from the electronic device, the electronic device sends predictor values such as device identifiers, device geo location, wireless signal strength to the local authentication device. The local authentication device then computes a risk score based on the received predictor values and historical predictor values. Some or all of the predictor values can be generated inside the local authentication device. For example, geo location can be determined using a GPS sensor embedded in the local authentication device. The local authentication device sends this risk score, either directly or through the electronic device, to a remote authentication server which determines from this risk score and other factors whether the user is able to be authenticated or step-up authentication is required.

Advantageously, the improved technique allows for a user to be authenticated without exposing the user's privacy information to a third party over an insecure network. The authentication device is able to compute a risk score from locally collected information taken from the electronic device requesting a transaction and/or the authentication device itself, as well as historical information about the user, that electronic device and other devices. Such information is not exposed to a third party over insecure networks. Further, the authentication device sends the computed risk score over an insecure network instead of potentially sensitive user data. In some arrangements, the authentication device can improve security further by embedding the risk score in a code such as a one-time password or encrypting the risk score.

One embodiment of the improved technique is directed to a method of authenticating a user. The method includes receiving, by an authentication device, values of a set of predictors from an electronic device local to the authentication device. The method also includes generating a risk score based on the values of the set of predictors, the risk score being indicative of a likelihood that the user is an authorized user of the electronic device and the authentication device. The method further includes sending the risk score to an authentication server located remote from the electronic device, the authentication server being configured to provide an authentication result based on the risk score, the authentication result indicating whether the user is the authorized user of the resources being requested access to.

Additionally, some embodiments of the improved technique are directed to a system constructed and arranged to authenticate a user. The system includes a network interface, memory, and a controller including controlling circuitry constructed and arranged to carry out the method of authenticating a user.

Furthermore, some embodiments of the improved technique are directed to a computer program product having a non-transitory computer readable storage medium which stores code including a set of instructions which, when executed by a computer, cause the computer to carry out the method of authenticating a user.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves sending a user's information to a local authentication device that computes a risk score and sends the risk score to a remote authentication server that helps to determine whether the user is able to be authenticated. When the user makes an authentication or transaction request from an electronic device such as a computer or smartphone, the electronic device sends predictor values such as device identifiers, device geo location, wireless signal strength to the local authentication device. The local authentication device then computes a risk score based on the received predictor values and historical predictor values. The local authentication device sends this risk score, either directly or through the electronic device, to a remote authentication server which determines from this risk score and other factors whether the user is able to be authenticated or step-up authentication is required.

Advantageously, the improved technique allows for a user to be authenticated without exposing the user's privacy information to a third party over an insecure network. The authentication device is able to compute a risk score from locally collected information taken from the electronic device requesting a transaction and/or the authentication device itself, as well as historical information about the user, that electronic device and other devices. Such information is not exposed to a third party over insecure networks. Further, the authentication device sends the computed risk score over an insecure network instead of potentially sensitive user data. In some arrangements, the authentication device can improve security further by embedding the risk score in a code such as a one-time password or encrypting the risk score.

Figure 1:
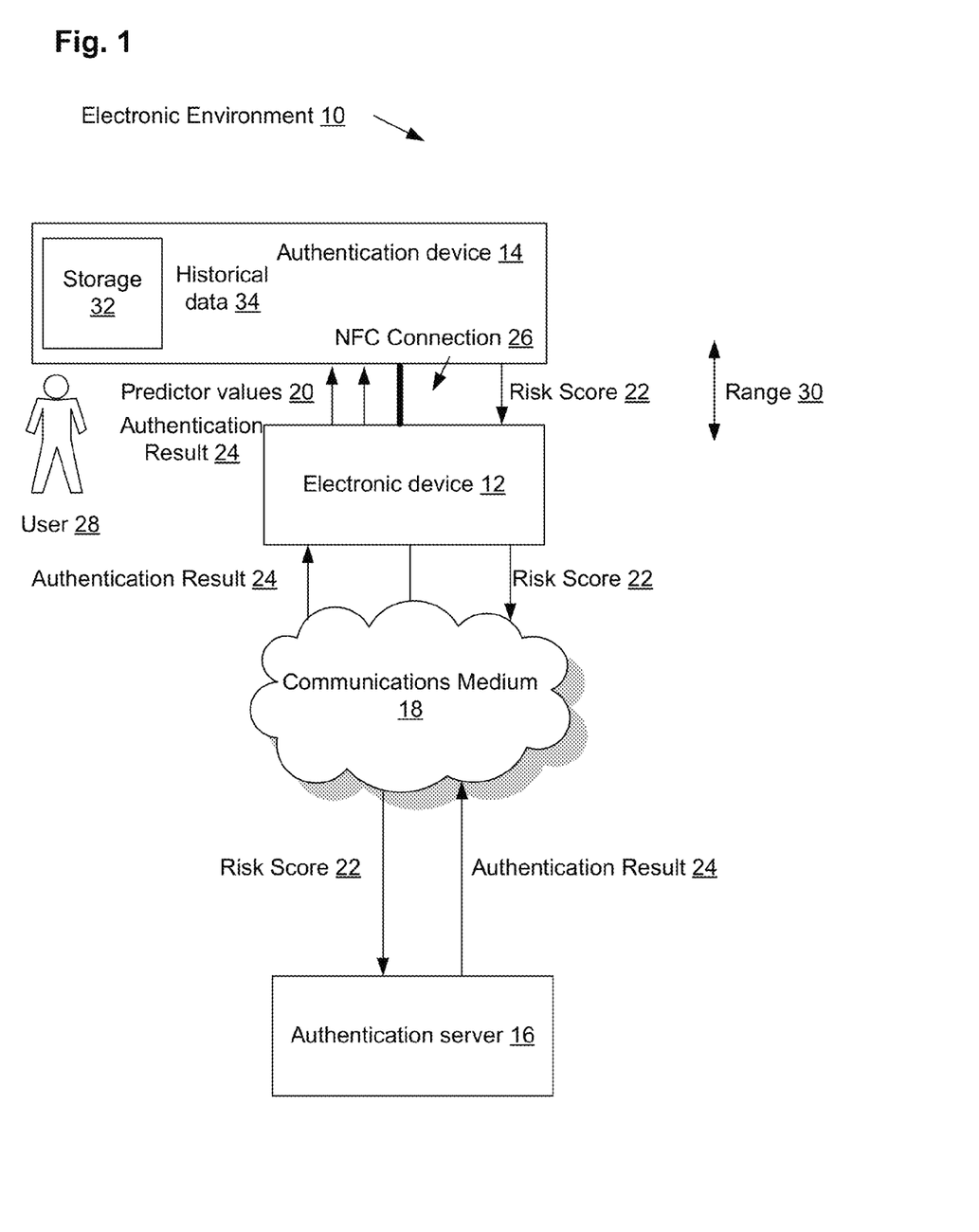
FIG. 1 is a block diagram illustrating an example electronic environment for carrying out the improved technique.

FIG. 1 illustrates an example electronic environment 10 for carrying out the improved technique. Electronic environment 10 includes electronic device 12, authentication device 14, authentication server 16, and communications medium 18.

Electronic device 12 is configured to allow a user 28 to conduct an electronic transaction such as a credit card purchase via a browser or an app. Electronic device 12 can take the form of a computer such as a laptop computer, smartphone, tablet computer, or the like.

Electronic device 12 may be further configured to be accessed only by authorized users. In some arrangements, such as a desktop computer, there may be multiple authorized users each having an account accessed through a password. In other arrangements, such as a smartphone, there may only be a single authorized user accessed through a password or a biometric such as a fingerprint.

In some arrangements, electronic device 12 is enabled to communicate with another device over a near-field communication (NFC) medium 26 or any wireless medium having a range not exceeding 100 feet. An NFC-device may establish radio communication with another NFC-enabled device by touching the devices together or bringing them into close proximity, usually no more than, say, 10 cm or less. Applications of NFC may include contactless transactions and data exchange.

Local authentication device 14 is configured to receive transaction data including predictor values 20 from electronic device 12. Predictor values 20 that authentication device 14 receives may include an account number, purchase amount, device identifiers, geolocation, and the like which allow authentication device 14 to estimate the likelihood that user 28 is an authorized user of the account. To calculate risk score 22, authentication device 14 may use a variety of methods, including but not limiting to rule-based computation, statistical analysis, and machine learning techniques such as supervised learning, unsupervised learning, and reinforcement learning. In some arrangements, however, authentication device 14 may simply be a software application or embedded hardware inside electronic device 12 or another computer.

In some arrangements, authentication device 14 is configured to receive transaction data over NFC medium 26. In such a case, user 28 brings electronic device 12 to within a pre-specified range 30, e.g., 10 cm or less. In other arrangements, however, authentication device 14 is configured to receive transaction data over a wireless medium such as Bluetooth® or a wired connection.

Further, authentication device 14 is configured to compute a risk score 22 from the transaction data and historical data stored on the device. Such a risk score is indicative of the likelihood that user 28 making the authentication or transaction request is an authorized user of the account. Authentication device 14 is also configured to send risk score 22 to authentication server 16 through electronic device 12 over communications medium 18. In some arrangements, authentication device 14 is configured to send risk score 22 directly to authentication server 16.

In some arrangements, authentication device 14 is also configured to receive an authentication result 24 from authentication server 16 via electronic device 12 over communications medium 18. In such a case, authentication device 14 is configured to use a machine learning algorithm—whether supervised, unsupervised, or reinforced—to make adjustments in how it computes future risk scores.

In some arrangements, electronic device 12 is also configured to receive an authentication result 24 from authentication server 16 over communication medium 18 to allow or disallow user 28 from accessing protected resources on the device.

Communications medium 18 provides network connections between electronic device 12 and authentication server 16 that may be insecure. Communications medium 18 may implement a variety of protocols such as TCP/IP, UDP, ATM, Ethernet, Fibre Channel, combinations thereof, and the like. Furthermore, communications media 18 may include various components (e.g., cables, wireless, switches/routers, gateways/bridges, NAS/SAN appliances/nodes, interfaces, etc.). Moreover, the communications medium 18 are capable of having a variety of topologies (e.g., queue manager-and-spoke, ring, backbone, multi drop, point to-point, irregular, combinations thereof, and so on).

Authentication server 16 is configured to provide an authentication result 24 based on risk score 22 and other authentication data. Authentication result 24 indicates whether user 28 is authorized to access protected resources such as the authorized user's account. Authentication server 16 is also configured to send authentication result 24 to an institution (e.g., banking institution) for communication with user 28. In some arrangements, as noted above, authentication server 16 is configured to send authentication result 24 to electronic device 12 over communications medium 18.

During an example operation, user 28 wishes to conduct a credit card transaction using NFC-enabled electronic device 12. To effect this, user 28 brings electronic device to within range 30 of authentication device 14, e.g., as instructed by an app if electronic device is a smartphone or tablet, or a Javascript program in a browser window of a computer. When electronic device 12 is in range 30 of authentication device 14, electronic device 12 transmits transaction data including predictor values 20 to authentication device 14.

Authentication device 14, upon receiving predictor values 20, extracts historical data 34 from storage 32 and performs a computation of risk score 22. Historical data 32 typically includes data from previous transaction requests from electronic device 12. Further details of the computation of risk score 12 are presented below in connection with FIG. 4.

In some arrangements, authentication device 14 also generates a one-time password (OTP). Further details of the use of the OTP in authentication will be discussed below in connection with FIG. 3.

In some arrangements, upon computing risk score 22, authentication device 14 transmits risk score 22 to authentication server 16 via electronic device 12 over communications medium 18. Upon receiving risk score 22, authentication server draws upon other authentication data which it uses in conjunction with risk score 22 to provide an authentication result 24 that indicates whether user 28 is authorized to conduct the credit card transaction. Authentication server 16 sends authentication result 24 to the bank that manages the credit card account for communication with user 28 and, in some arrangements, to authentication device 14 for training.

Further details of authentication device 14 are discussed below in connection with FIG. 2.

Figure 2:
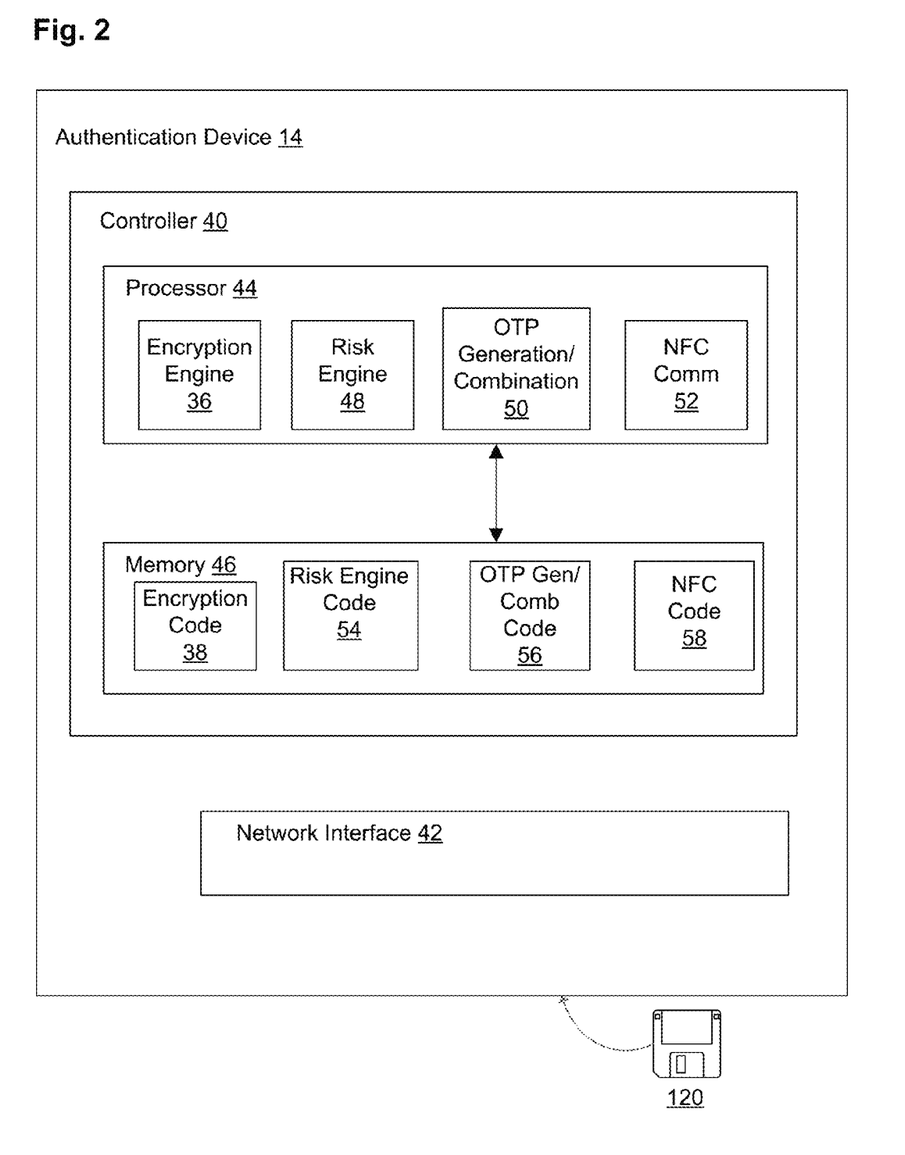
FIG. 2 is a block diagram illustrating an example authentication device within the electronic environment shown in FIG. 1.

FIG. 2 illustrates authentication device 14. Authentication device 14 includes controller 40, which in turn includes processor 44 and memory 46; and network interface 42.

Network interface 42 takes the form of a wired interface or a wireless interface. In other arrangements, network interface 42 includes an interface for NFC communications for sending and receiving data over NFC connection 26.

Memory 46 is configured to store encryption code 38, risk engine code 54, OTP generation/combination code 56, and NFC code 58. Memory 46 generally takes the form of, e.g., random access memory, flash memory or a non-volatile memory.

Encryption code 38 contains instructions for data encryption such as encrypting risk score or decrypting transaction data including predictor values 20.

Risk engine code 54 contains instructions for computing risk score 22 (see FIG. 1) from predictor values 20 and historical data 34.

NFC code 58 contains instructions for detecting an NFC device and establishing NFC connection 26.

OTP engine code 56 contains instructions for generating an OTP and embedding risk score 22 within the OTP for transmission to authentication server 16.

Processor 44 takes the form of, but is not limited to, Intel or AMD-based MPUs, and can include a single or multi-cores each running single or multiple threads. Processor 44 is coupled to memory 46 and is configured to execute instructions from encryption code 38, risk engine code 54, OTP generation/combination code 56, and NFC code 58 via encryption engine 36, risk engine 48, OTP generation/combination engine 50, and NFC communication module 52, respectively.

Further details of the OTP generation/combination engine are discussed below in connection with FIG. 3.

Figure 3:
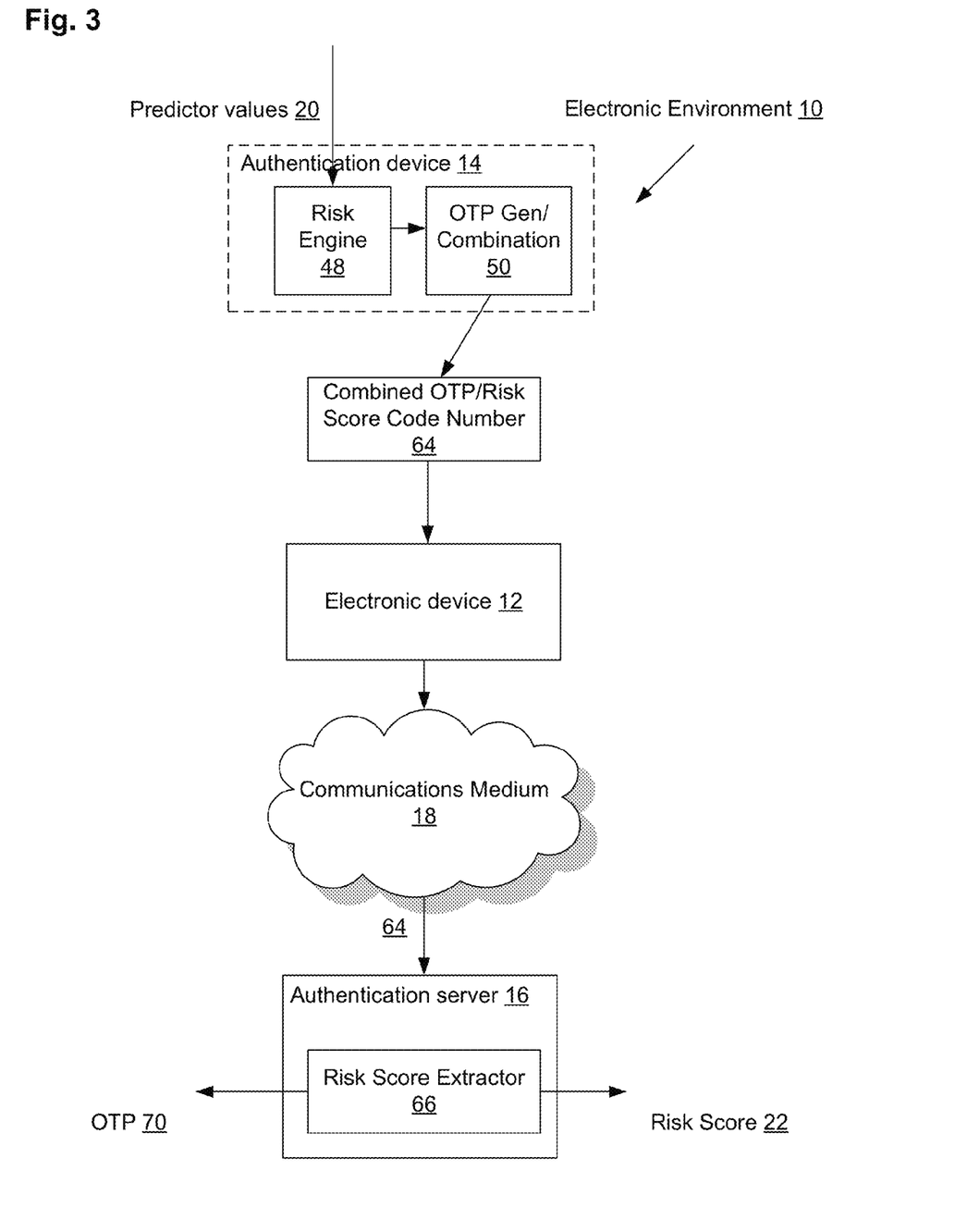
FIG. 3 is a block diagram illustrating an example risk engine and OTP token within the electronic environment shown in claim 1.

FIG. 3 illustrates example electronic environment 10 with an OTP being transmitted to authentication server 16 from authentication device 14.

During operation, electronic device 12 transmits predictor values 20 (see FIG. 1) to authentication device 14 as part of an authentication process for conducting, e.g., a credit card purchase. Authentication device 14, upon receiving predictor values 20, computes risk score 22 via risk engine 48.

Authentication device 14 generates OTP 70 and embeds risk score 22 into OTP 70 to form a combined OTP/risk score number 64, via OTP generation/combination module 50. In one example, OTP generation/combination module performs a XOR operation on OTP 70 and risk score 22 to form combined number 64. Although there are many possible such operations, a combination operation should be reversible by authentication server 16.

Upon performing the combination operation, authentication device 14 sends combined number 64 to authentication server 16, which in turn includes a risk score extractor 66 that separates risk score 22 from OTP 70.

Upon the separation of risk score 22 and OTP 70 from combined number 64, authentication server compares OTP 70 with an expected number from an OTP server. If the number matches satisfactorily, then authentication server 16 evaluates risk score 22 to form authentication result 24. For example, if risk score 22 is smaller than a threshold, then authentication server 16 sends a message to the bank that manages the credit card that user 28 has been authenticated and that the transaction may proceed. If larger than the threshold, however, authentication server 16 sends a message that user 28 has not been authenticated and that further action may be required.

Further details regarding an example computation of risk score 22 are discussed below in connection with FIG. 4.

Figure 4:
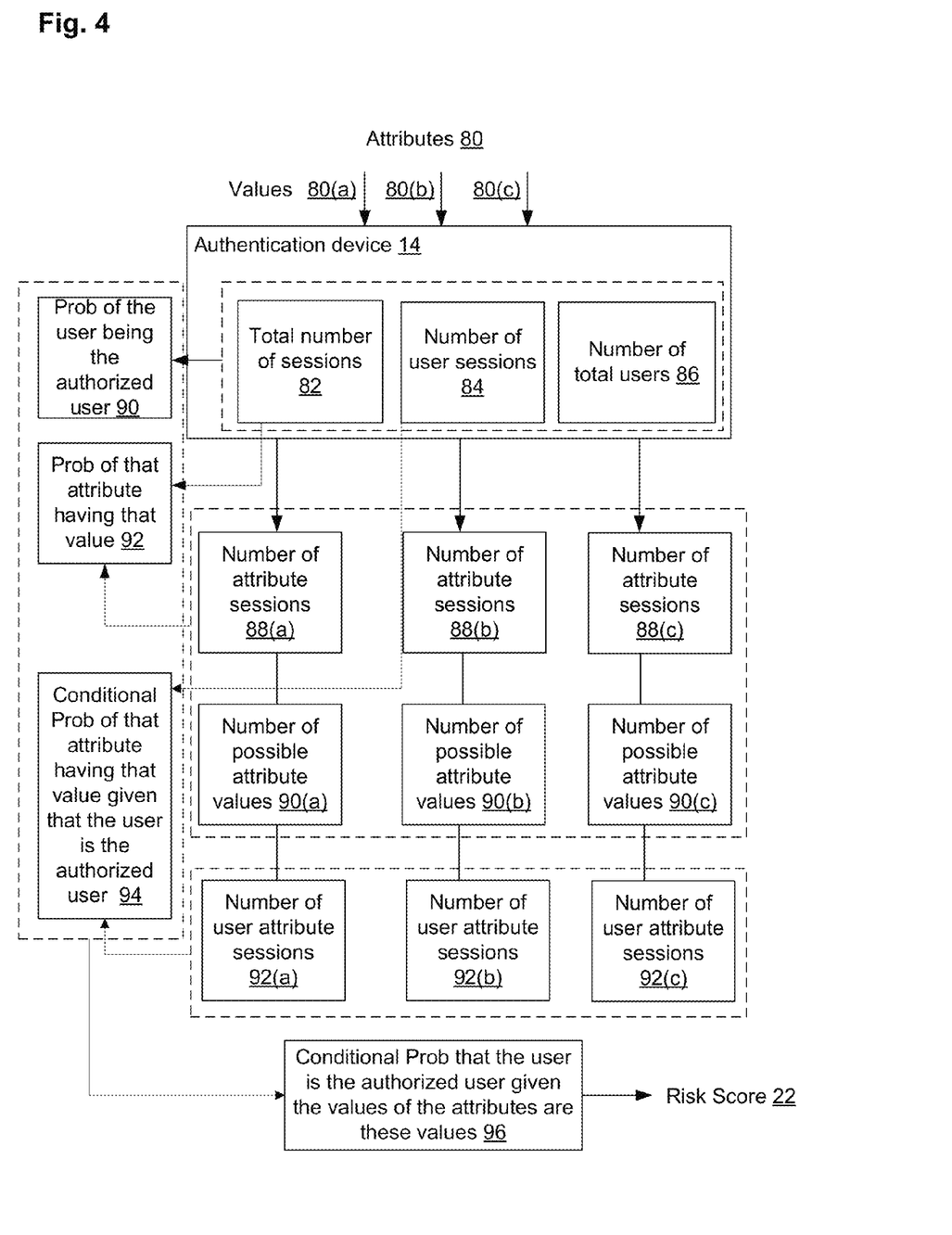
FIG. 4 is a block diagram illustrating another example authentication device within the electronic environment shown in claim 1.
Figure 5:
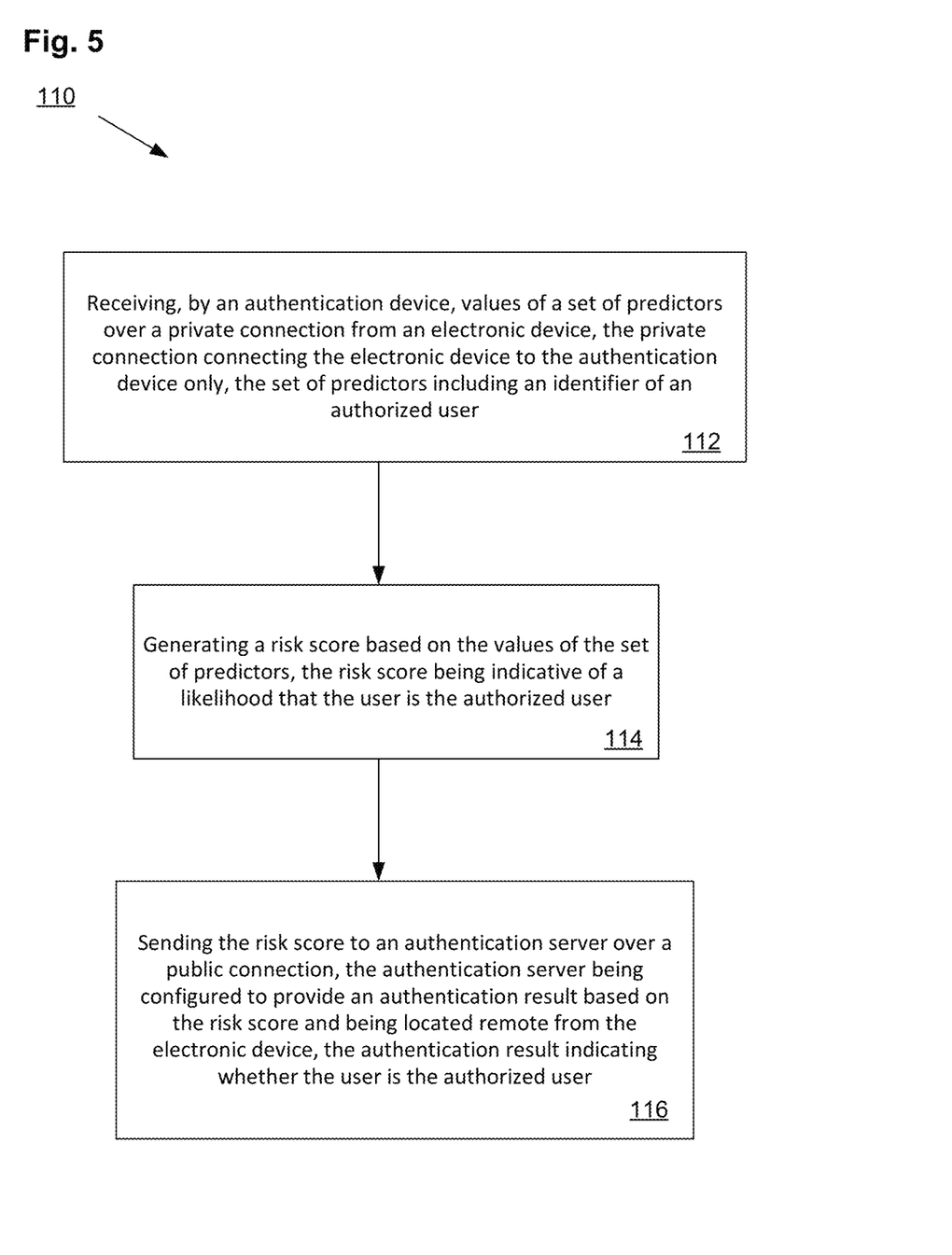
FIG. 5 is a flow chart illustrating an example method of carrying out the improved technique within the electronic environment shown in FIG. 1.

FIG. 4 illustrates authentication device 14, and a number of factors involved in computing risk score 22. Electronic device 12 sends, as predictor values 20, values of a number of attributes 80 of electronic device 12 and user activities. For example, electronic device 12 sends values of attributes 80(a), 80(b), and 80(c); attribute 80(a) may be a strength of a wireless signal within the locality of electronic device 12 and authentication device 14, attribute 80(b) may be a purchase amount, and attribute 80(c) may be a level of processor activity on electronic device 12. It should be understood, however, that the improved technique described here applies to any number of attributes. Electronic device 12 also sends, as part of the transaction, a value of a user identifier identifying the authorized user to whom user 28 wishes to be authenticated in order that the transaction be completed.

Upon receiving values of attributes 80(a), 80(b), and 80(c), authentication device 14 extracts historical data 34 from storage 32. Historical data 34 includes a total number of sessions 82, a session being an instance in which a transaction request was received by authentication device 14. Historical data 34 also includes a number of user sessions 84, a user session being an instance where in which a user has been successfully authenticated to be a specified authorized user. Historical data 34 further includes a number of total authorized users 86.

From this historical data 34, authentication device 14 computes, for each attribute 80(a), 80(b), and 80(c), a number of attribute sessions 88(a), 88(b), and 88(c); a number of possible attribute values 90(a), 90(b), and 90(c); and a number of user attribute sessions 92(a), 92(b), and 92(c), respectively. Each attribute session is a session in which an attribute carries a specific value. Each user attribute session is a session in which a user has been successfully authenticated to be a specified authorized user and an attribute carries a specific value. For attributes having continuous values, the number of possible values may be binned into a finite number of ranges of values.

In some arrangements, authentication device 14 employs a naïve Bayes model to compute risk score 22. A naïve Bayes model has the following mathematical form $$P(U = u \mid A = a) = P(U = u) \prod_i \frac{P(A_i = a_i \mid U = u)}{P(A_i = a_i)},$$

where P(U=u|A=a) is the conditional probability that the user U is the authorized user u given that the set of attributes A takes on the received values a, P(U=u) is equal to the probability 90 that the user U is the authorized user u, $P(A_i=a_i)$ is the probability 92 that the specific attribute $A_i$ takes on the received value $a_i$, and $P(A_i=a_i|U=u)$ is the conditional probability 94 that the specific attribute $A_i$ takes on the received value $a_i$ given that the user U is the authorized user u. It should be understood that, in the example above, the index i takes the values 1, 2, and 3.

In some arrangements, authentication device 14 computes the above conditional probability as follows:

$$P(U = u \mid A = a) = \frac{N_a^u}{N_s^a},$$

where $N_s^a$ is the number of sessions satisfying A=a and $N_a^u$ is the number of sessions satisfying A=a and U=u. In many situations, however, these quantities are difficult to compute or estimate, and estimations that use the above described quantities 88, 90, and 92 are employed instead.

For example, using what's known as a Laplace estimate, authentication device 14 performs the following calculation of the probability 90 of the user being the authorized user:

$$P(U = u) = \frac{N_s^u + 1}{N_s + N_u}$$

where $N_s$ is the total number of sessions 82, $N_u$ is the total number of authorized users 86, and $N_s^u$ is the number of user sessions 84. Within this estimate, authentication device also performs the following calculation of the probability 92 that the specific attribute $A_i$ takes on the received value $a_i$:

$$P(A_i = a_i) = \frac{N_s^{a_i} + 1}{N_s + N_{a_i}}$$

where $N_{a_i}$ is the number of possible attribute values 90 for the ith attribute $A_i$ and $N_s^{a_i}$ is the number of attribute sessions 88.

Further, using what's known as an M-estimate, authentication device 14 performs the following calculation of the conditional probability 94 that the specific attribute $A_i$ takes on the received value $a_i$ given that the user U is the authorized user u:

$$P(A_i = a_i \mid U = u) = \frac{N_u^{a_i} + 2P(A_i = a_i)}{N_s^u + 2}$$

where $N_u^{a_i}$ is the number of user attribute sessions 92 for the ith attribute $A_i$.

In addition to computing risk score 22, authentication device 14 may also use, in some arrangements, the above-described naïve Bayes model and estimates in a supervised machine learning model. As discussed above, authentication server 16 may send authentication result 24 to authentication device 14. Upon receiving authentication result 24, authentication device 14 can provide values of weights to any of the above quantities in order to improve future correlations of risk score and authentication results. In other arrangements, machine learning algorithms may also be unsupervised or reinforced.

Furthermore, encryption engine 36 may use a key stored in memory 46 to encrypt PII, encrypt risk score 22, or decrypt authentication result 24.

While various embodiments of the invention have been particularly shown and described, it will be understood by those skilled in the art that various changes in form and details may be made therein without departing from the spirit and scope of the invention as defined by the appended claims.

For example, while the examples above described a credit card transaction, the improved techniques described above may be applied to other types of transactions in which authentication is necessary, such as financial and medical transactions.

It should be understood that other estimates for the probabilities in the naïve Bayes model may be used. For example, estimates from various continuous probability distributions, rather than the Laplace estimates, that may be relevant to the application at hand may result in different estimates. Examples of other distributions include a normal distribution, an exponential distribution, and a Student's t-distribution.

It should be further understood that other probabilistic models may be used in computing risk score 22 than the above-described naïve Bayes model. For example, estimates of parameters such as historical attribute values used in computing risk may be made through a maximum likelihood estimation algorithm.

It should also be understood that, in the case of authentication device 14 being embedded hardware inside electronic device 12, authentication device 14 communicates with electronic device 12 over an internal connection, e.g., a bus, pins from a chip, etc.

Furthermore, it should be understood that some embodiments are directed to authentication device 14, which is constructed and arranged to perform an authentication of a user. Some embodiments are directed to a process of performing an authentication of a user. Also, some embodiments are directed to a computer program product which enables computer logic to cause a computer to perform an authentication of a user.

In some arrangements, authentication device 14 is implemented by a set of processors or other types of control/processing circuitry running software. In such arrangements, the software instructions can be delivered, within authentication device 14, either in the form of a computer program product 120 (see FIG. 2) or simply instructions on disk or in preloaded in memory 46 of authentication device 14, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of performing authentication of a user, the method comprising:
   receiving, by an authentication device, values of a set of predictors from an electronic device local to the authentication device;
   generating a risk score based on the values of the set of predictors, the risk score being indicative of a likelihood that the user is an authorized user that the user asserts to be; and
   sending the risk score to an authentication server located remote from the electronic device, the authentication server being configured to provide an authentication result based on the risk score, the authentication result indicating whether the user is the authorized user that the user asserts to be;

wherein the set of predictors includes values of a set of attributes and a value of an identifier of the authorized user;

wherein the risk score includes a naïve Bayes model that is based on i) the values of the set of attributes and ii) the value of the identifier of an authorized user; and wherein generating the risk score includes producing a probability of the user being the authorized user;

wherein producing the probability of the user being the authorized user includes:
  generating a total number of sessions, a session being an instance where in which a value of the identifier was received by the authentication device,
  generating a number of user sessions, a user session being an instance where in which a user has been successfully authenticated to be a specified authorized user,
  generating a total number of authorized users, and
  forming, as the probability of the user being the authorized user, a ratio of one more than the number of user sessions to a sum of the number of total authorized users and the total number of sessions.

2. A method as in claim 1,
wherein the electronic device is configured to form a connection with the authentication device over a wireless medium having a range not exceeding 100 feet; and
wherein receiving the values of the set of predictors includes:
  obtaining the values of the set of predictors over the wireless medium when the electronic device is within a specified range of the wireless medium.

3. A method as in claim 1,
wherein the authentication device includes a token configured to generate a one-time password (OTP);
wherein receiving the values of the set of predictors includes:
  obtaining an OTP from the token; and
wherein sending the risk score to an authentication server includes:
  transmitting the OTP to the authentication server.

4. A method as in claim 3,
wherein transmitting the OTP to the authentication server includes:
  embedding the risk score within the OTP to form an authentication code, and
  sending the authentication code to the authentication server, the authentication server being configured to extract the risk score from the authentication code.

5. A method as in claim 1,
wherein generating the risk score further includes:
  for each attribute of the set of attributes:
    producing a probability of that attribute having the value of that attribute received by the authentication device, and
    producing a conditional probability of that attribute having the value of that attribute received by the authentication device given that the user is the authorized user.

6. A method as in claim 5,
wherein the naïve Bayes model includes a conditional probability that the user is the authorized user given that the values of the attributes are those received by the authentication device;
wherein generating the risk score further includes:
  for each attribute of the set of attributes, producing a ratio of the conditional probability of that attribute having the value of that attribute received by the authentication device given that the user is the authorized user to the probability of that attribute having the value of that attribute received by the authentication device as a probability ratio for that attribute; and
  producing, as the conditional probability that the user is the authorized user given that the values of the attributes are those received by the authentication device a product of the probability of the user being the authorized user, a product of the probability ratios of each attribute of the set of attributes and the probability of the user being the authorized user.

7. A method as in claim 5,
wherein producing a probability of that attribute having the value of that attribute received by the authentication device includes:
  obtaining a number of possible values of that attribute,
  generating a number of attribute sessions, an attribute session being an instance in which an attribute carries a specific value, and
  forming, as the probability of that attribute having the value of that attribute received by the authentication device, a ratio of one more than the number of attribute sessions to a sum of the number of possible values of that attribute and the total number of sessions.

8. A method as in claim 7,
wherein producing the conditional probability of that attribute having the value of that attribute received by the authentication device given that the user is the authorized user includes:
  generating a number of user attribute sessions, a user attribute session being an instance in which a user has been successfully authenticated to be a specified authorized user and an attribute carries a specific value, and
  forming, as the conditional probability of that attribute having the value of that attribute received by the authentication device given that the user is the authorized user, a ratio of a sum of the number of user attribute sessions and twice a probability of that attribute having the value of that attribute received by the authentication device and two more than the number of user sessions.

9. A method as in claim 1, further comprising:
receiving the authentication result from the authentication server, and
performing a machine learning operation, the machine learning operation performing an adjustment to the naïve Bayes model.

10. A method as in claim 1,
wherein generating the risk score includes:
  obtaining a mathematical model of the risk score as a function of the set of predictors;
  adjusting the mathematical model using a machine learning algorithm based on historical values of the set of predictors; and
  producing an adjusted risk score according to the adjusted mathematical model.

11. A method as in claim 1, further comprising:
encrypting the values of the set of predictors.

12. A method as in claim 1,
wherein the authentication device is embedded within the electronic device; and
wherein receiving the values of a set of predictors from the electronic device includes:
  obtaining the values of the set of predictors over an internal connection within the electronic device.

13. A method as in claim 1,
wherein sending the risk score to the authentication server includes:
transmitting the risk score to the authentication server directly from the authentication device.

14. A method as in claim 1, further comprising:
prior to sending the risk score to the authentication server, encrypting the risk score to produce an encrypted risk score; and
wherein sending the risk score to the authentication server includes:
transmitting the encrypted risk score to the authentication server.

15. A method of performing authentication of a user, the method comprising:
receiving, by an authentication device, values of a set of predictors;
generating a risk score based on the values of the set of predictors, the risk score being indicative of a likelihood that the user is an authorized user that the user asserts to be; and
sending the risk score to an authentication server located remote from the electronic device, the authentication server being configured to provide an authentication result based on the risk score, the authentication result indicating whether the user is the authorized user that the user asserts to be;
wherein the set of predictors includes values of a set of attributes and a value of an identifier of the authorized user;
wherein the risk score includes a naïve Bayes model that is based on i) the values of the set of attributes and ii) the value of the identifier of an authorized user; and
wherein generating the risk score includes producing a probability of the user being the authorized user;
wherein producing the probability of the user being the authorized user includes:
generating a total number of sessions, a session being an instance where in which a value of the identifier was received by the authentication device,
generating a number of user sessions, a user session being an instance where in which a user has been successfully authenticated to be a specified authorized user,
generating a total number of authorized users, and
forming, as the probability of the user being the authorized user, a ratio of one more than the number of user sessions to a sum of the number of total authorized users and the total number of sessions.

16. An electronic apparatus constructed and arranged to perform authentication of a user, the apparatus comprising:
a network interface;
memory; and
a controller including controlling circuitry coupled to the memory, the controlling circuitry being constructed and arranged to:
receive values of a set of predictors from an electronic device local to the authentication device;
generate a risk score based on the values of the set of predictors, the risk score being indicative of a likelihood that the user is an authorized user that the user asserts to be; and
send the risk score to an authentication server located remote from the electronic device, the authentication server being configured to provide an authentication result based on the risk score, the authentication result indicating whether the user is the authorized user that the user asserts to be;
wherein the set of predictors includes values of a set of attributes and a value of an identifier of the authorized user;
wherein the risk score includes a naïve Bayes model that is based on i) the values of the set of attributes and ii) the value of the identifier of an authorized user; and
wherein the controlling circuitry constructed and arranged to generate the risk score is further constructed and arranged to produce a probability of the user being the authorized user;
wherein the controlling circuitry constructed and arranged to produce the probability of the user being the authorized user is further constructed and arranged to:
generate a total number of sessions, a session being an instance where in which a value of the identifier was received by the authentication device,
generate a number of user sessions, a user session being an instance where in which a user has been successfully authenticated to be a specified authorized user,
generate a total number of authorized users, and
form, as the probability of the user being the authorized user, a ratio of one more than the number of user sessions to a sum of the number of total authorized users and the total number of sessions.

17. An apparatus as in claim 16,
wherein the electronic device is configured to form a connection with the authentication device over a wireless medium having a range not exceeding 100 feet; and
wherein the controlling circuitry constructed and arranged to receive the values of the set of predictors over the private connection is further constructed and arranged to:
obtain the values of the set of predictors over the wireless medium when the electronic device is within a specified range of the wireless medium.

18. A computer program product having a non-transitory, computer-readable storage medium which stores instructions that, when executed by a computer, causes the computer to carry out a method of performing authentication of a user, the method comprising:
receiving, by an authentication device, values of a set of predictors from an electronic device local to the authentication device;
generating a risk score based on the values of the set of predictors, the risk score being indicative of a likelihood that the user is an authorized user that the user asserts to be; and
sending the risk score to an authentication server located remote from the electronic device, the authentication server being configured to provide an authentication result based on the risk score, the authentication result indicating whether the user is the authorized user that the user asserts to be;
wherein the set of predictors includes values of a set of attributes and a value of an identifier of the authorized user;
wherein the risk score includes a naïve Bayes model that is based on i) the values of the set of attributes and ii) the value of the identifier of an authorized user; and
wherein generating the risk score includes producing a probability of the user being the authorized user;
wherein producing the probability of the user being the authorized user includes:
generating a total number of sessions, a session being an instance where in which a value of the identifier was received by the authentication device,
generating a number of user sessions, a user session being an instance where in which a user has been successfully authenticated to be a specified authorized user, generating a total number of authorized users, and forming, as the probability of the user being the authorized user, a ratio of one more than the number of user sessions to a sum of the number of total authorized users and the total number of sessions.

19. A computer program product as in claim 18, wherein the electronic device is configured to form a connection with the authentication device over a wireless medium having a range not exceeding 100 feet; and wherein receiving the values of the set of predictors over the private connection includes:

obtaining the values of the set of predictors over the wireless medium when the electronic device is within a specified range of the wireless medium.

* * * * *